Aug. 15, 1933.    A. KNOWLES    1,922,700
CONCRETE MIXER
Filed Nov. 11, 1929    2 Sheets-Sheet 1

INVENTOR.
ALBERT KNOWLES
ATTORNEYS.

Aug. 15, 1933.　　　　A. KNOWLES　　　　1,922,700
CONCRETE MIXER
Filed Nov. 11, 1929　　2 Sheets-Sheet 2
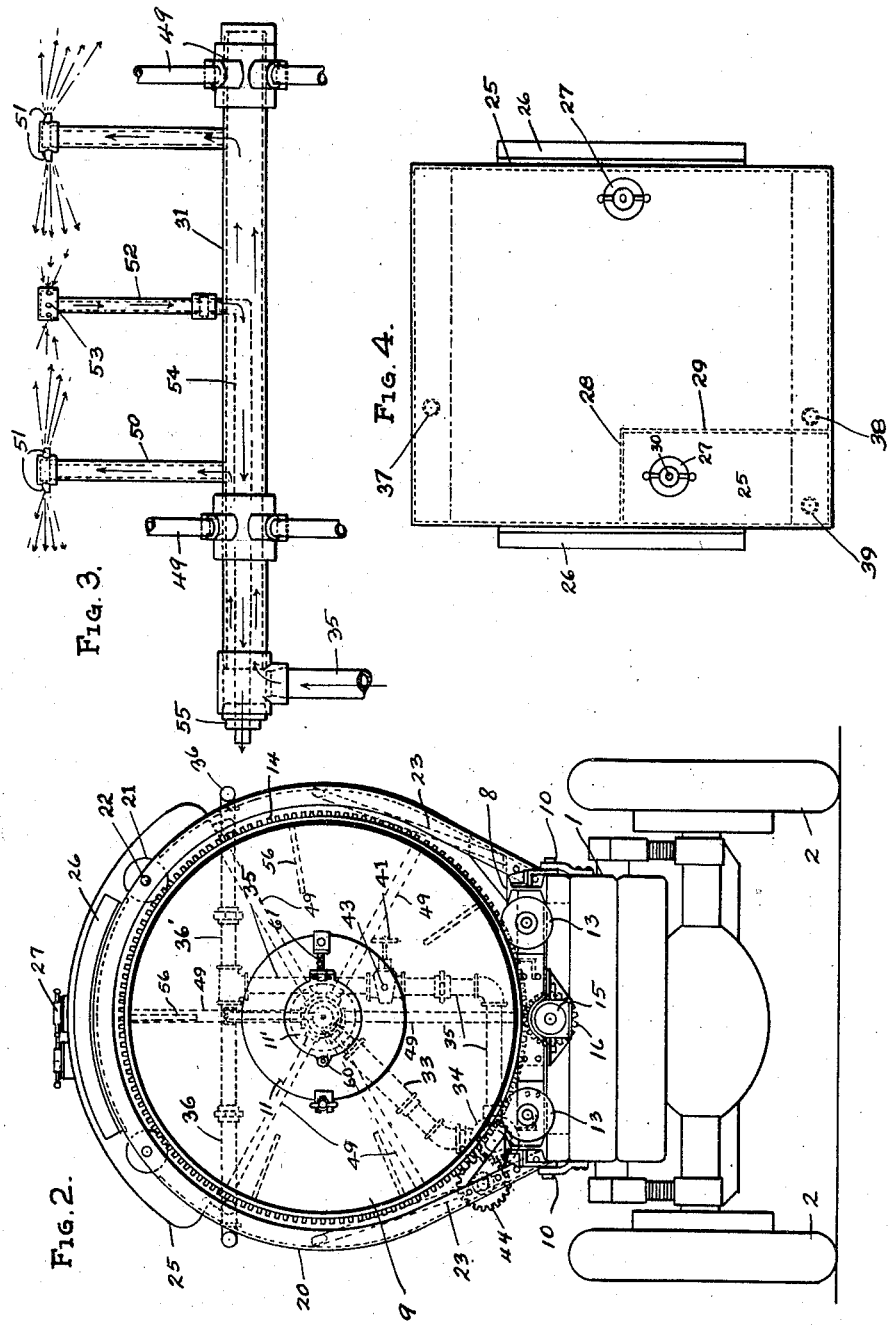
INVENTOR.
ALBERT KNOWLES
BY *Miller Boykin & [illegible]*
ATTORNEYS.

Patented Aug. 15, 1933 1,922,700

UNITED STATES PATENT OFFICE 1,922,700

CONCRETE MIXER

Albert Knowles, San Francisco, Calif., assignor to Transit Mixers, Inc., San Francisco, Calif., a Corporation of Nevada Application November 11, 1929
Serial No. 406,359

17 Claims. (Cl. 83—73)

This invention relates to power-operated mixers as used principally in the mixing of concrete materials, and particularly to such mixers of the revolving drum type in which the apparatus is mounted on a motor truck for revolving and dumping by power derived from the truck engine and controlled from the driver's cab.

The invention has as its objects general improvements in a structure of the character outlined.

In the drawings accompanying this application Fig. 1 is a side elevation of the improved drum type mixer on its motor truck and with certain portions of the structure broken away.

Fig. 2 is a rear end view of the truck.

Fig. 3 is an enlarged detached view of the water and vent piping as shown dotted in Fig. 1.

Fig. 4 is a plan view of the water tank of Fig. 1 there shown mounted above the drum.

Figure 1:
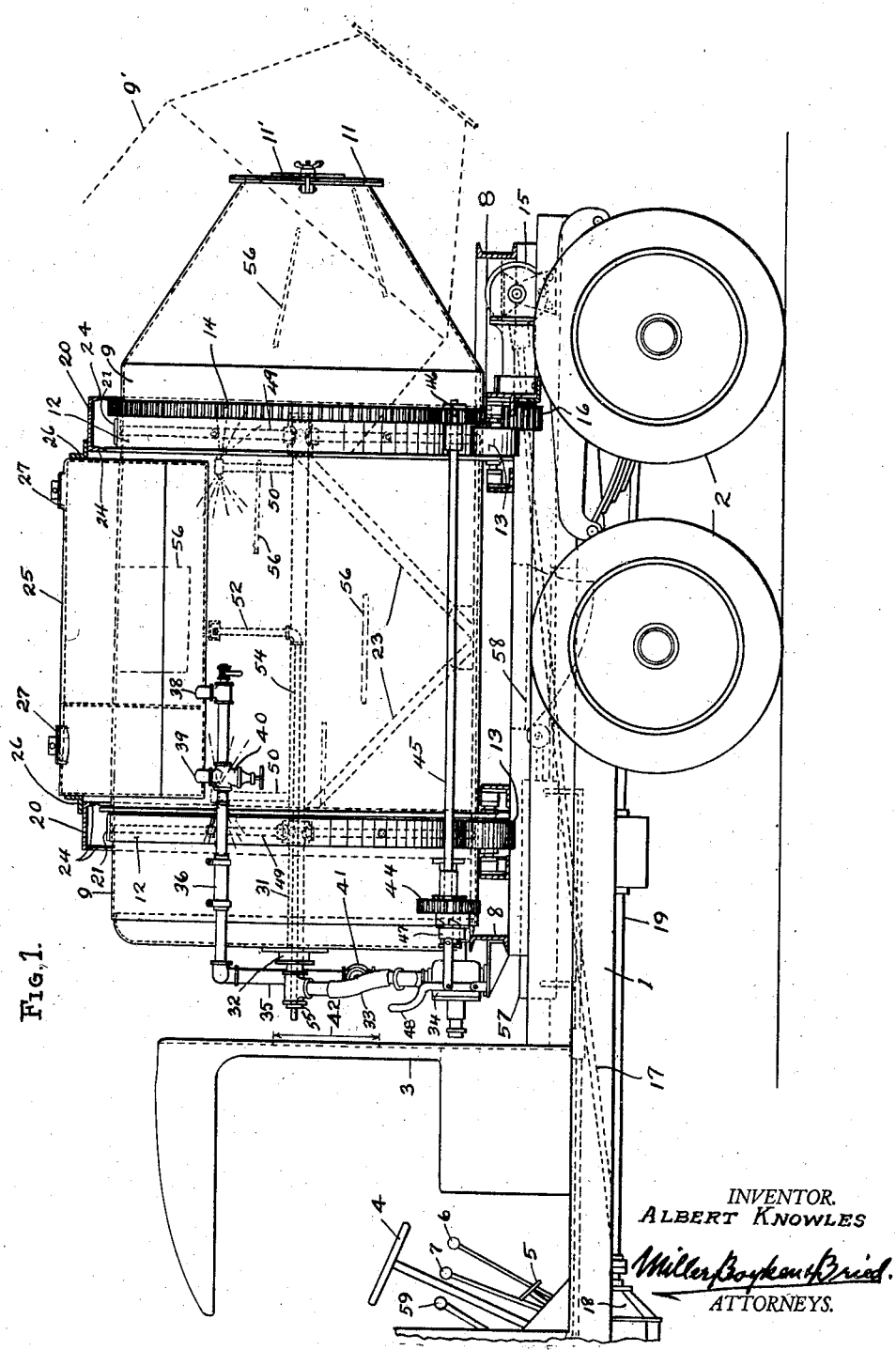

In further detail the drawings show at 1 a portion of the chassis frame of a motor truck, rear wheels 2, driver's cab 3, steering wheel 4, clutch pedal 5, transmission gear shifting lever 6, power take-off gear shifting lever 7.

Mounted on top of the chassis frame is a tilting or dump frame 8 on which the cylindrical mixing drum 9 is revolvably mounted.

The tilting frame is horizontally pivoted at its rear end at 10 to the chassis frame so that the forward end may be elevated to thereby tilt the drum to the dotted position 9' to dump the contents of the drum out of its rear conical end when the closure plate 11 is opened.

The drum is provided with trunnion rings or tracks 12 and is cradled on idler rollers 13 revolvably carried by the tilting frame, and the drum is fitted with a ring gear 14 through which it may be rotated from the power of the truck engine whether tilted or not, through means of suitable transmission indicated at 15, 16, of known type receiving power from a shaft 17 extending to the power take-off 18 of the truck controlled by lever 7 independent of the main drive shaft 19 of the truck, the arrangement providing at all times controlled revolution of the drum in either direction from the gears (not shown) of the power take-off, also providing various speeds and a neutral position through manipulation by a driver in the cab of lever 7 of the power take-off in the known manner.

The drum is provided interiorly with suitable mixing blades 56, has a fixed head at its end adjacent the cab, and it is held in place on the idlers 13 by means of two channel irons 20 secured at their lower ends to the tilting frame and arched upward around the drum. These channels are relatively wide and are inverted over the trunnion rings 12 and ring gear 14 and carry additional idler rollers 21 aligned with the trunnion rings with the shafts 22 of the idlers passing through the legs of the channel and the upper portions of the rollers projecting through openings in the web of the channels.

The arched channels are provided with angularly arranged heavy braces 23 on both sides and which converge downwardly and are secured at their lower ends to the tilting frame so that as the vehicle travels up and down grades or as the frame is tilted the great weight of the drum will be carried by the trunnion ring flanges 24 bearing against the sides of the idlers.

Above the central portion of the drum is a sheet metal water tank 25 closed on all sides, curved to follow the curve of the drum, and supported on the arched channels 20 by means of angle plates 26 projecting from the tank and secured to the channels.

This tank has vented inlet caps 27, at opposite ends and is divided within by a longitudinally extending partition wall 28 and a transversely extending wall 29 forming two compartments, a main compartment adapted to hold enough water for a full load of concrete materials, and a smaller compartment used principally for washing out the mixer after dumping the load.

The elevated tank and vented caps will permit the water to flow out by gravity if desired, but since much difficulty has been experienced in gravity feed of water to mixers of this type through clogging of the water outlets by the concrete materials, the water is forced under high pressure to the interior of the drum through a special piping arrangement comprising a central or axially arranged pipe 31 extending preferably through a stuffing box 32 at the head or closed end of the drum and connected with the outlet side 33 of a pump 34 preferably of the positive type, and which pump receives its water from a pipe 35 branched at 36, 36' to opposite sides of the drum and connected at 37, 38, 39 with the compartments in the tank so as to drain the water therefrom. A valve 40 being supplied on one of the tank connections so that the compartment connected therewith may be shut off and held in reserve when an extra wet mix is wanted or for flushing the drum, the capacity of the other compartment being sufficient for maximum load requirements, but only filled at each trip with the number of gallons required for the actual load being transported so that it may be entirely drained for each mix.

On the pump inlet pipe 35 is a valve 41 accessible to the driver in the cab through an opening 42 in the rear wall thereof so that the flow of water may be controlled by the driver, and this valve is provided with an air vent indicated at 43 opened when the valve is closed so as to relieve the pump when the valve is closed off while the pump is running and to force a constant stream of compressed air out of the water nozzles to prevent clogging of the same when no water is being ejected.

The pump is mounted on the tilting frame so as to be carried bodily with it in tilting and is driven by a gear 44 free on a shaft 45 also carried by the tilting frame, extending along-side the drum and having a pinion 46 on its rear end in mesh with the ring gear 14 of the drum. A clutch 47 splined on shaft 45 and engageable with gear 44 is provided for connecting or disconnecting the pump with shaft 45, and a clutch control lever 48 extends adjacent the cab for manipulation by the driver.

Pipe 31 extending within the drum is rotatably supported in two spider arms 49 secured within the drum aligned with the trunnion rings 12 thus serving the double purpose of stiffening the rings and supporting the pipe. The rear end of the pipe is capped, and projecting upwardly from the pipe are two or more stand pipes 50 closed on top and provided with side outlets or nozzles 51. These pipes project upwardly as far as permitted by the revolving blades 56 and thereby greatly increase the size of the load which may be mixed in the drum without clogging the nozzle orifices.

Also provided is a vertically arranged air escape or pressure relief pipe 52 capped on top and provided with side inlets 53 to relieve the air pressure built up within the closed drum caused by forceful injection of water or air thereto as well as by the chemical action of the cement in hydrating. This relief pipe 52 passes through a sealed or welded joint into pipe 31 and connects with an internal pipe 54 passing tightly through a bushing 55 at the outer end of pipe 31 and is freely open to atmosphere.

I have used a small vent hole in the center of the door on the discharge end of the drum, but the arrangement described permits a load rising higher than the center of the drum.

The closure plate or door 11 on the conical discharge end of the drum is suitably bolted or otherwise secured for quick removal and this plate is centrally apertured with a smaller discharge opening closed by a second plate or door 11' preferably frictionally pivoted to the larger plate at 60 and clamped in place by a suitable latch or bolt 61 so that it may be opened. This smaller door on the larger door is of considerable value either for examining the mix or in discharging into some types of conveying apparatus.

The dumping apparatus or hoist employed for lifting the forward end of the tilting frame so as to discharge the load, is not involved in the present invention as many such hoists operated by the truck power are readily available, but in the drawings the cylinder of such hoist of the hydraulic type is indicated at 57 mounted on the chassis operative against a segment 58 carried by the tilting frame, and controlled by a lever 59 from a special clutch or other power take-off not shown, commonly provided on motor trucks for operating the hoist.

In operation of the apparatus the drum may be revolved in either direction during transit of the truck or while standing, and while dumping the load. The pump may be connected or disconnected with the power by the driver in the cab and the flow of water may also be otherwise controlled from the cab by valve 41.

In considering the invention particular attention is called to the spiders 49 revolvably supporting the central water pipe, and the additional value of these internal spiders in connection with the trunnion rings or tracks 12, for on account of the drum carrying an extremely heavy load deformation is liable to take place unless tracks with an exceptionally large cross section are used, whereas with the spiders light tracks can be used while still preserving rotundity under heavy loads.

The relation of the water spray nozzles 51 to the air escape nozzles 53 is such that the latter are washed free of accumulations which might quickly impair the operation of the air pipe or choke the air escape openings entirely.

The powerful spray from the water nozzles also serves to thoroughly clean the drum after discharge of the load, the water from the auxiliary compartment 25 is principally used for that purpose and as the drum is slowly rotated preferably at the dumping angle, the fine streams from the nozzles strike with sufficient force against the walls of the drum and mixing blades to cut off all adhering cement so that the drum is perfectly clean for the next load.

My use of the words "concrete mixer" in the claims is not to be considered limiting but to include any mixer of the general character described whether used for mixing concrete or other materials.

I claim:

1. In a concrete mixer, a horizontally disposed rotatable closed end cylindrical drum adapted to contain the materials to be mixed, a fixed water pipe extending axially into the drum, a vertically arranged extension on said fixed pipe arranged to extend upward through the mass of and discharge water above the materials being mixed, a spider secured within said drum revolvable around and supporting said fixed pipe at a point remote from said closed end and means for forcing water through the pipe into the drum.

2. In the construction specified in claim 1, a circular track secured to the outside of said drum, rollers engaging the track and supporting the drum for rotation, and a spider secured within the drum revolvable around and supporting said fixed pipe and bracing said track from within.

3. In a concrete mixer, a rotatable drum, a fixed water pipe therein, an upright branch on said pipe within the drum provided with an outlet adjacent its upper end, means for forcing water through the pipe, an air pipe within said fixed pipe vented to outer atmosphere, and an upright extension on said vent pipe open to the drum interior, said air pipe being in sealed relation to said water pipe.

4. A concrete mixer comprising a revolvable drum, means for closing the drum after introducing the materials to be mixed, means for introducing water under pressure to the interior of the drum, and a pipe passing through the materials extending from a point above the normal level of the materials and inside the drum to a point outside the said drum for permitting escape of excess pressure of gases from the space within the drum above the materials being mixed.

5. A concrete mixer comprising a revolvable drum, means for closing the drum after introducing the materials to be mixed, a pair of fixed pipes extending within the drum, means for supplying water under pressure to the drum through one of the pipes and the other pipe arranged with its inlet located above the normal level of the materials for relieving undue pressure built up in the drum.

6. A concrete mixer comprising a horizontally revolvable cylindrical drum, a pair of circular tracks secured around said drum, rollers on which the tracks are cradled, a frame supporting the rollers, inverted channel irons arched over the drum aligned over the tracks and with their lower ends secured to said frame, and additional rollers bearing on said tracks carried by the arched channels above the drum projecting through openings in the webs of the channels.

7. A concrete mixer comprising a cylindrical horizontally arranged revolvable drum, a water tank arched over the top of the drum and supported free thereof, outlet piping arranged for discharging water from the tank to the drum branched to connect opposite ends of the tank at opposite sides of the drum, and a reserve compartment in the tank provided with a valved pipe connecting said outlet piping.

8. A horizontally arranged concrete mixing drum having a conical discharge end provided with a discharge opening closed by a door, and a smaller opening in said door closed by a second door both of the doors being free for opening to discharge the concrete.

9. A horizontally arranged concrete mixing drum having a conical discharge end provided with a discharge opening closed by a door, and a smaller opening in said door arranged axially of the drum, both of the doors being free for opening to discharge the concrete.

10. In a concrete mixer, water piping arranged for injecting water into the mixer, a pump for forcing the water through the piping, and means for supplying air to the pump for forcing through the piping when no water is flowing so as to prevent clogging of the pipe openings by the material being mixed.

11. The combination in a concrete mixer, of a rotatable cylindrical drum, a circular track secured to the outside of said drum, rollers engaging the track and supporting the drum for rotation, and a spider secured within the drum in alignment with said track for bracing the same from within.

12. The combination in a concrete mixer of a rotatable drum, a track secured to the outside of said drum, rollers engaging the track and supporting the drum for rotation, and a spider secured within the drum for bracing the same from within adjacent said track.

13. The combination in a concrete mixer, of a rotatable drum, means for closing the drum after introducing the materials to be mixed, including piping means for supplying a stream of water under pressure to the interior of the drum, and means for permitting escape of excess pressure of gases from within the drum, said last mentioned means including a pipe with air intake end disposed in such a manner to be impinged by and cleaned by water from said stream.

14. The combination in a concrete mixer, of a rotatable drum, a fixed water pipe therein having an upright branch within the drum, provided with an outlet adjacent its upper end, means for forcing water through the pipe, and an air pipe within said fixed pipe vented to outer atmosphere and having an upright extension thereon open to the drum interior, said water outlet and upright extension opening being disposed in a manner whereby said last mentioned opening is impinged by the water discharged from said outlet.

15. The combination in a concrete mixer, of a revolvable drum, means for closing the drum after introducing the materials to be mixed, a pair of fixed pipes extending within the drum, means for supplying water under pressure to the drum through one of the pipes and the other pipe arranged for relieving undue pressure built up in the drum, both said pipes projecting upwardly in the drum above the materials mixed therein, with their upper ends terminating in relation to one another whereby the pressure release pipe is cleaned by the water discharging from the water supply pipe.

16. The combination in a concrete mixer, of a rotatable drum adapted to contain the materials to be mixed, a fixed water pipe extending axially into the drum, a plurality of spaced verticaly arranged extensions on said fixed pipe arranged to discharge water above the materials being mixed, means for forcing water through the pipe into the drum, an air pipe within said fixed pipe vented to outer atmosphere and being in sealed relation to said water pipe, and an upright extension on said vent pipe open to the drum interior and being disposed intermediate of the vertically arranged extensions of said fixed pipe, said vent pipe extension having its upper end terminating in relation to the upper ends of the fixed pipe extensions, whereby the water discharged from the latter prevents clogging of the vent pipe.

17. A concrete mixer comprising a horizontally revolvable cylindrical drum, a pair of circular tracks secured around said drum, rollers on which the tracks are cradled, a frame supporting the rollers, and inverted channel irons arched over the drum forming rigid housings aligned over the tracks and with their lower ends secured to said frame, a water tank arched over the top of the drum free therefrom and supported at opposite ends from said inverted channels.

ALBERT KNOWLES.